(12) United States Patent
Chen (10) Patent No.: US 7,523,907 B2
(45) Date of Patent: Apr. 28, 2009

(54) HANGER FOR ELECTRONIC APPARATUS (75) Inventor: Min-Yu Chen, Lienchiang County (TW)

(73) Assignee: BENQ Corporation, Taoyuan (TW)

( * ) Notice: Subject to any disclaimer, the term of this patent is extended or adjusted under 35 U.S.C. 154(b) by 262 days.

(21) Appl. No.: 11/322,226

(22) Filed: Jan. 3, 2006

(65) Prior Publication Data
US 2006/0145038 A1 Jul. 6, 2006

(30) Foreign Application Priority Data
Jan. 4, 2005 (TW) ............................. 94100139 A (51) Int. Cl.
*E04G 3/00* (2006.01)
(52) U.S. Cl. .......................... 248/292.12; 248/292.13; 248/323; 248/339; 24/68 R; 24/68 CD
(58) Field of Classification Search ............ 248/292.12, 248/291.1, 292.14, 292.13, 294.1, 123.11, 248/125.2, 125.3, 323, 325, 339, 923, 920, 248/309.1, 317, 297.31; 254/217; 24/68 CD, 24/68 R
See application file for complete search history.

(56) References Cited
U.S. PATENT DOCUMENTS
3,774,247 A * 11/1973 Bradley ....................... 5/53.2
5,205,020 A * 4/1993 Kamper .................... 24/68 CD
6,354,549 B2 * 3/2002 Sweere et al. ........... 248/292.14
6,457,701 B1 * 10/2002 Huang ......................... 254/217
6,554,242 B2 * 4/2003 Kim ............................ 248/371
6,886,701 B2 * 5/2005 Hong et al. .................... 211/99
6,964,399 B1 * 11/2005 O'Neill ................. 248/292.13
7,040,589 B2 * 5/2006 Wang .................... 248/289.11
7,175,146 B2 * 2/2007 Kim ......................... 248/279.1
2002/0033436 A1 * 3/2002 Peng et al. ............... 248/284.1

* cited by examiner

*Primary Examiner*—J. Allen Shriver
*Assistant Examiner*—Todd M. Epps
(74) *Attorney, Agent, or Firm*—Muncy, Geissler, Olds & Lowe, PLLC (57) ABSTRACT

A hanger for an electronic apparatus. The hanger comprises a base mounted to a wall, a bracket pivoting on the base, a first link pivoting on the base and comprising a ratchet with a plurality of teeth, and a second link with a stopper rotatably connecting the first link and the bracket. The angle between the bracket and the base is varied by the stopper engaging each tooth of the ratchet. The bracket can rotate between a first position and a second position. When the bracket is in the first position, the bracket overlaps the base, and in the second position, the angle between the bracket and the base is maximized.

10 Claims, 12 Drawing Sheets

HANGER FOR ELECTRONIC APPARATUS

BACKGROUND OF THE INVENTION

1. Field of the Invention

The invention relates to a hanger for an electronic apparatus, and in particular to a hanger capable of positioning an electronic apparatus in different inclined positions.

2. Brief Discussion of the Related Art

As liquid crystal displays (LCD) are light and compact, they are often mounted on walls by hangers. When a LCD is mounted on a wall, it is often inclined at an angle with respect to the wall. For a small LCD, the inclined angle is adjusted manually, and the LCD is positioned by friction. For a large LCD, as the weight is larger than the small LCD, friction is insufficient to position the LCD. When the inclined angle of a large LCD is to be changed, the LCD must be un-mounted from the hanger in advance, the hanger adjusted to a desired angle, and the LCD re-mounted on the hanger again.

SUMMARY OF THE INVENTION

A hanger for an electronic apparatus according to an embodiment of the invention comprises a base secured to a wall, a bracket pivoting on the base, a first link pivoting on the base and comprising a ratchet with a plurality of teeth, and a second link rotatably connecting the first link and the bracket and comprising a stopper. The angle between the bracket and the base is varied by the stopper engaging each tooth of the ratchet.

The bracket rotates between a first position and a second position. In the first position, the bracket overlaps the base, and in the second position, the angle between the bracket and the base is maximized.

The teeth are inclined toward the base, whereby the angle between the bracket and the base is adjustable when the bracket rotates from the first position to the second position and not adjustable when the bracket rotates from the second position to the first position.

The hanger of the invention further comprises a reset plate pivoting on the first link and rotating along with the second link. The reset plate releases the engagement of the stopper and the teeth when the bracket is in the first position, and the stopper re-engages the teeth when the bracket is in the second position.

The reset plate comprises a first portion higher than the teeth and a second portion lower than the teeth. When the bracket is in the first position, the stopper abuts the first portion, thereby releasing the engagement of the stopper and the teeth. When the bracket is in the second position, the stopper abuts the second portion, whereby the stopper re-engages the teeth.

The reset plate further comprises a protrusion between the first and second portions, the protrusion having a first side adjacent to the first portion and a second side adjacent to the second portion. When the bracket is in the first position, the stopper abuts the fist side and thereby abutting the first portion, and when the bracket is in the second position, the stopper abuts the second side and thereby abutting the second portion.

The second link further comprises a bias element biasing the stopper, thereby maintaining engagement of the stopper and the teeth. The bias element is preferably a compression spring.

Further scope of the applicability of the present invention will become apparent from the detailed description given hereinafter. However, it should be understood that the detailed description and specific examples, while indicating preferred embodiments of the invention, are given by way of illustration only, since various change and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein:

FIG. 5b is a side view of FIG. 5a;

FIG. 6b is a side view of FIG. 6a;

DETAILED DESCRIPTION OF THE PREFERRED EMBODIMENTS

Figure 1:
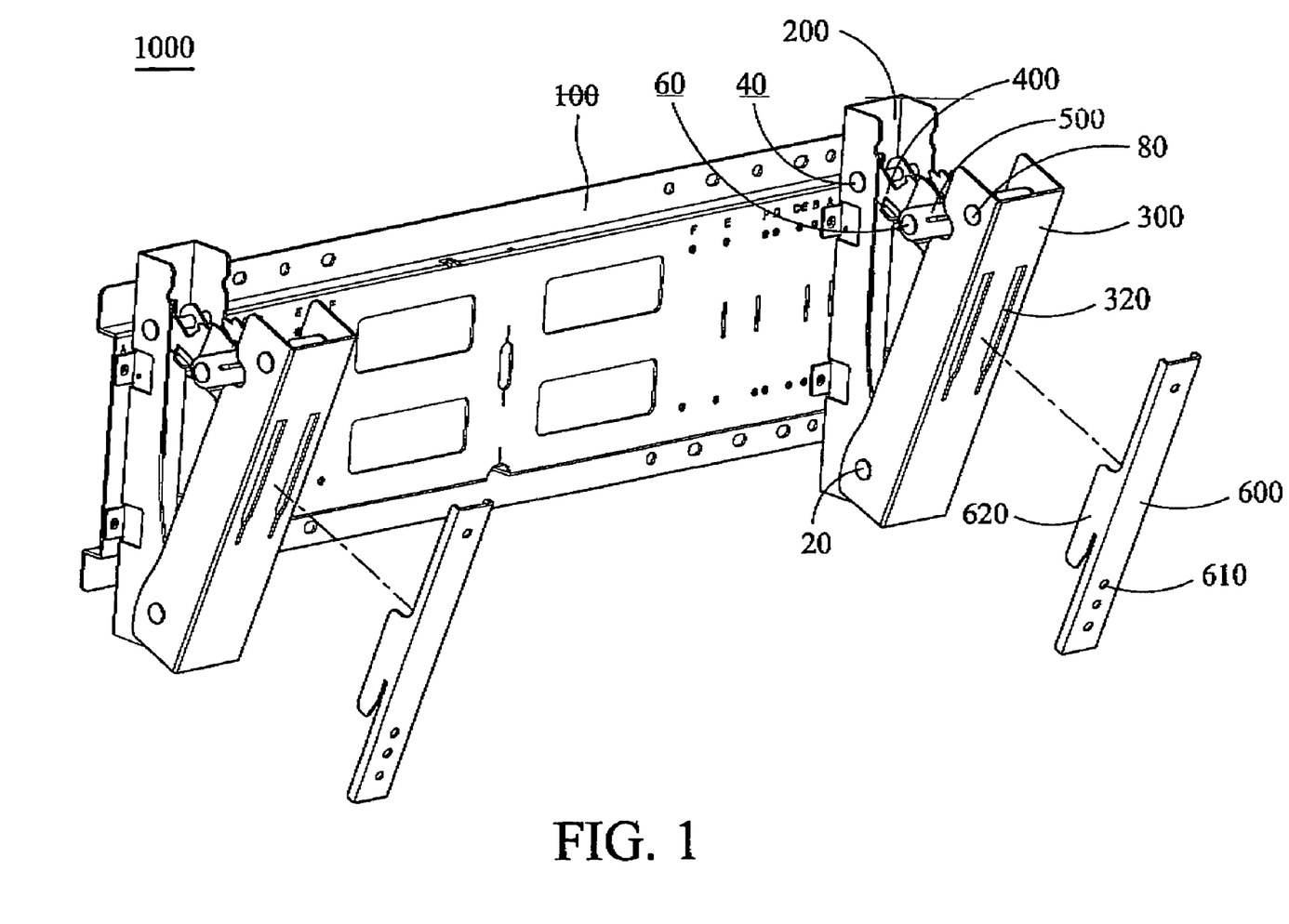
FIG. 1 is a perspective view of an embodiment of a hanger according to the invention.

Referring to FIG. 1, a hanger 1000 comprises a panel 100, a base 200, a bracket 300, a first link 400, a second link 500 and a joint element 600. The panel 100 is mounted on a wall (not shown). The base 200 is secured to the panel 100. The bracket 300 pivots on the base 200 by a first shaft 20 and is rotatable between a first position and a second position. The first link 400 pivots on the base 200 by a second shaft 40. The second link 500 is rotatably connected to the base 200 and the bracket 300 by a third shaft 60 and a fourth shaft 80 respectively. The joint element 600 has a hole 610, whereby the electronic apparatus connects with the joint element 600. The joint element 600 further has a hook 620, and the bracket 300 has a groove 320. The joint element 600 joins the bracket 300 by the hook 320 engaging the groove 320, whereby the electronic apparatus is mounted on the wall.

Figure 2:
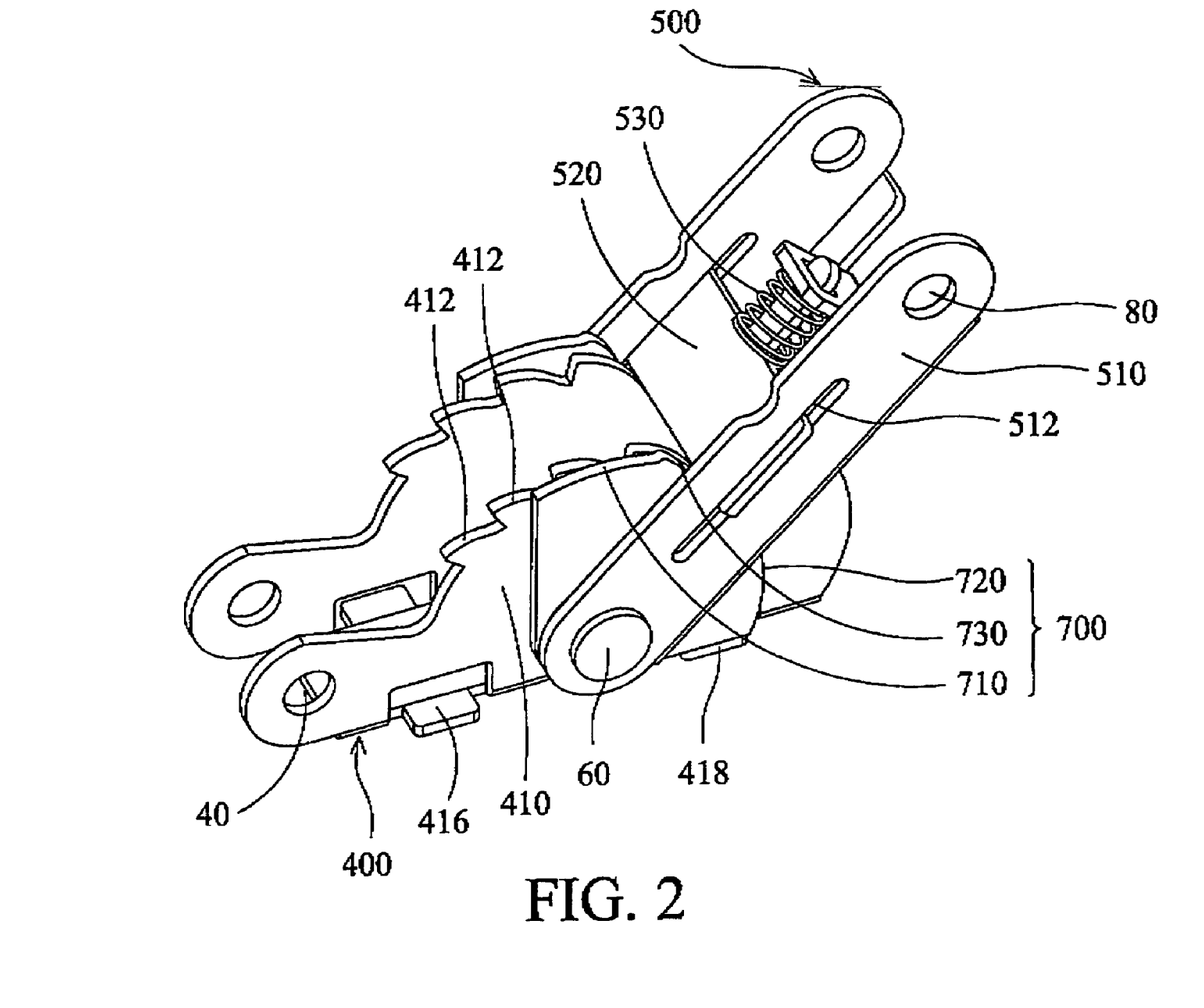
FIG. 2 is an assembled view of an embodiment of a first link and a second link of the invention.
Figure 3A:
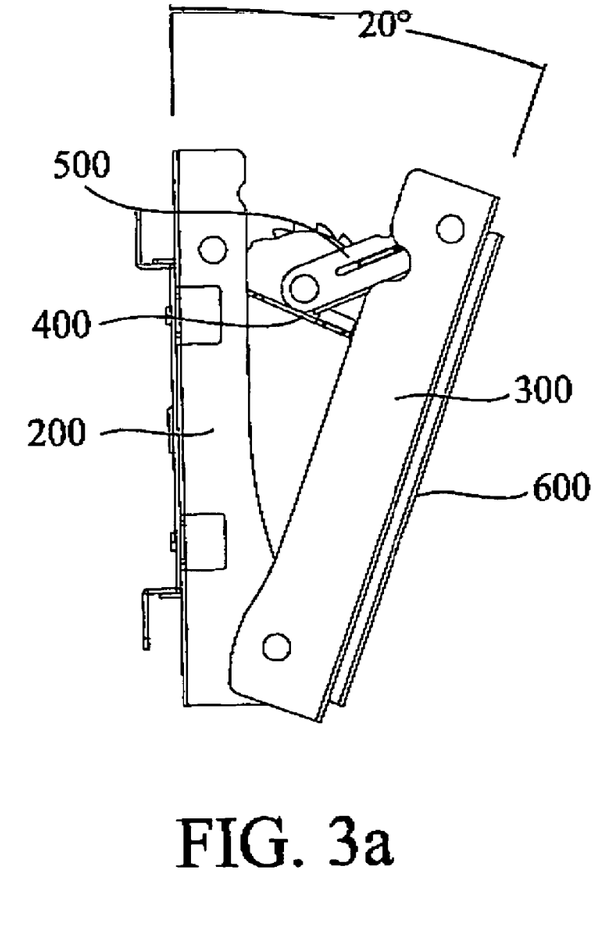
FIGS. 3a to 3e depict a bracket and a base of the invention at different inclined angles.
Figure 3B:
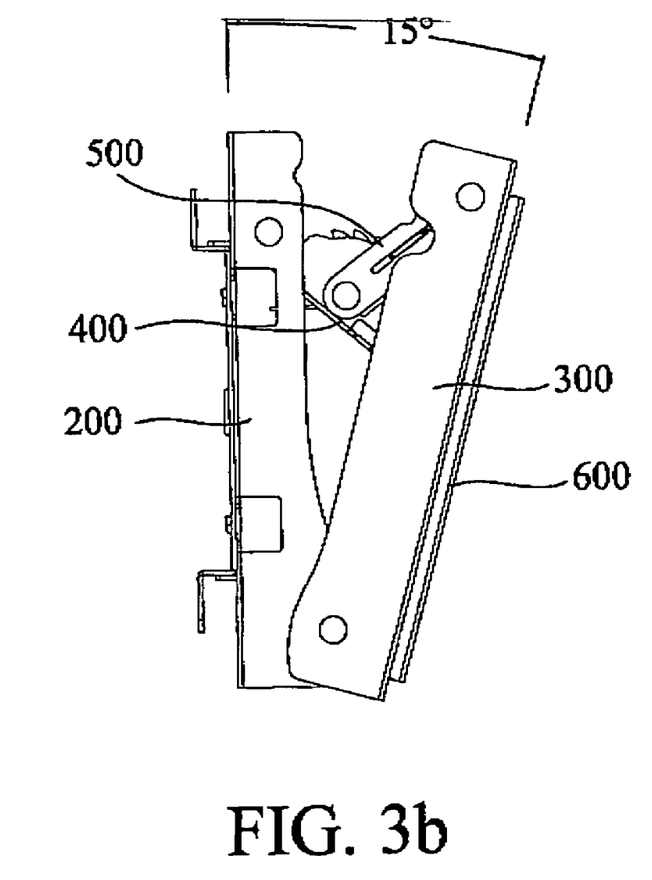
Figure 3C:
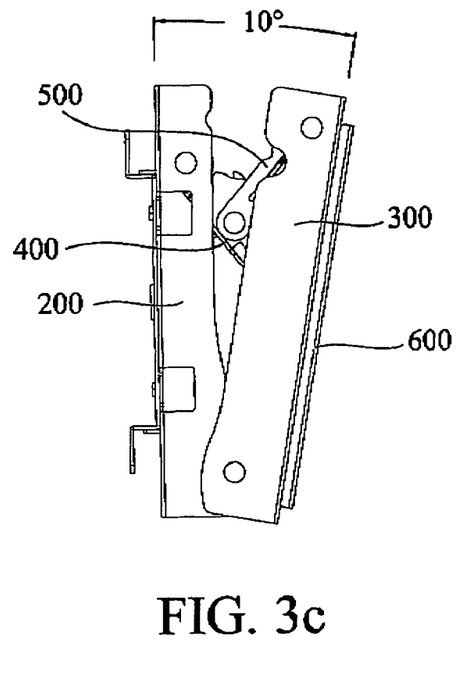
Figure 3D:
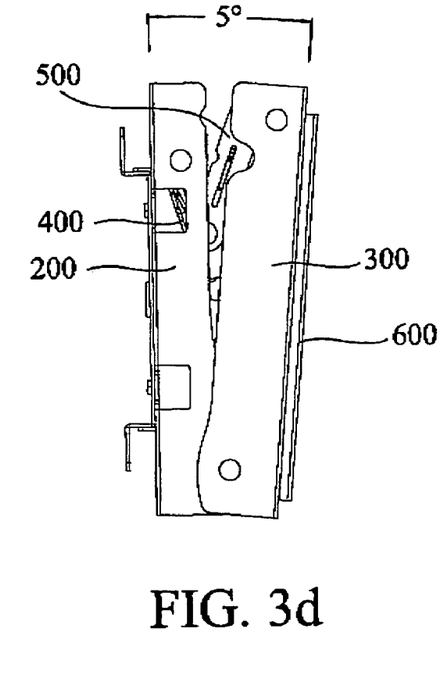
Figure 3E:
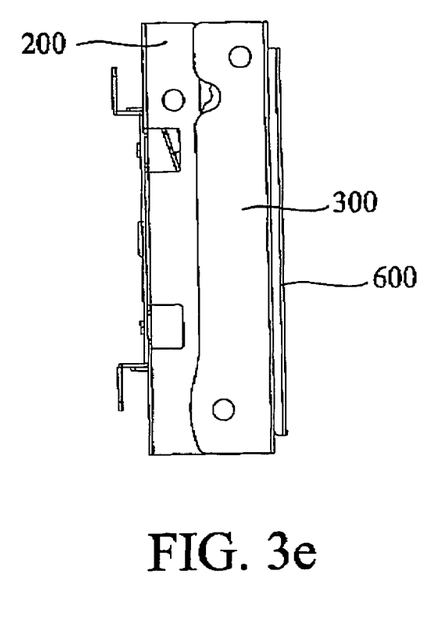

Referring to FIG. 2, the first link 400 pivots on the base 200 by the second shaft 40 and pivots on the second link 500 by the third shaft 60. The second link 500 pivots on the bracket 300 by the fourth shaft 80. To clearly describe motion of the first and second link 400 and 500, mention of the base 200 and the bracket 300 is omitted. The first link comprises a ratchet 410, a first tab 416 and a second tab 418. The ratchet 410 comprises a plurality of teeth 412 inclined toward the base 200. The second link 500 comprises a main body 510, a stopper 520 and a bias element (compression spring 530). The stopper 520 is slidably disposed on a groove 512 in the main body 510. The compression spring 530 is disposed between the main body 510 and the stopper 520. The stopper 520 is biased by the compression spring 530 to engage the teeth 412. As the teeth 412 incline toward the base 200, the second link 500 rotates toward the base 200 (counterclockwise in FIG. 2), changing the angle between the first link 400 and the second link 500, and the angle between the bracket 300 and the base 200. As the stopper 520 engages the teeth 412 to prevent the second link 500 from rotating clockwise, the angle between the first and second links 400 and 500 is maintained, that is the angle between the bracket 300 and the base 200 is maintained. The angle can only decrease, not increase.

The bracket 300 pivots on the base 200 and rotates between a first position and a second position. In this embodiment, when the bracket 300 is in the first position, the angle between the bracket 300 and the base 200 is −5°, and when the bracket 300 is in the second position, 20°. FIGS. 3a to 3e show the bracket 300 and the base 200, with angles therebetween 20°, 15°, 10°, 5° and 0° respectively. The inclined angle of the electronic apparatus is adjustable. As the teeth 412 are inclined toward the base 200, when the angle between the bracket 300 and the base 200 returns from 0° to 20°, a reset plate 700 is employed.

Figure 4:
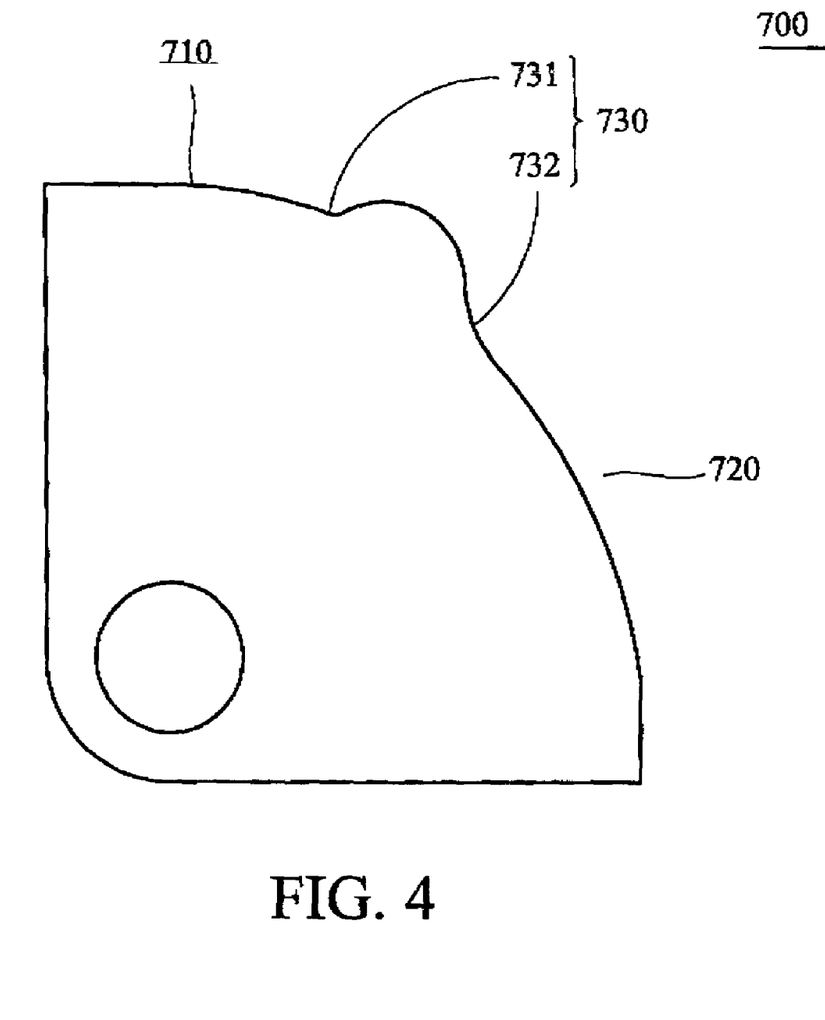
FIG. 4 is a schematic view of an embodiment of a reset plate according to the invention.

In FIG. 2, the reset plate 700 is disposed between the first link 400 and the second link 500 and pivots on the first link 400 by the third shaft 60. Referring to FIG. 4, the reset plate 700 comprises a first portion 710, a second portion 720 and a protrusion 730. The protrusion 730 has a first side 731 adjacent to the first portion 710 and a second side 732 adjacent to the second portion 720. The first portion 710 is higher than the teeth 412 and the second portion 720 is lower than the teeth 412.

Figure 5A:
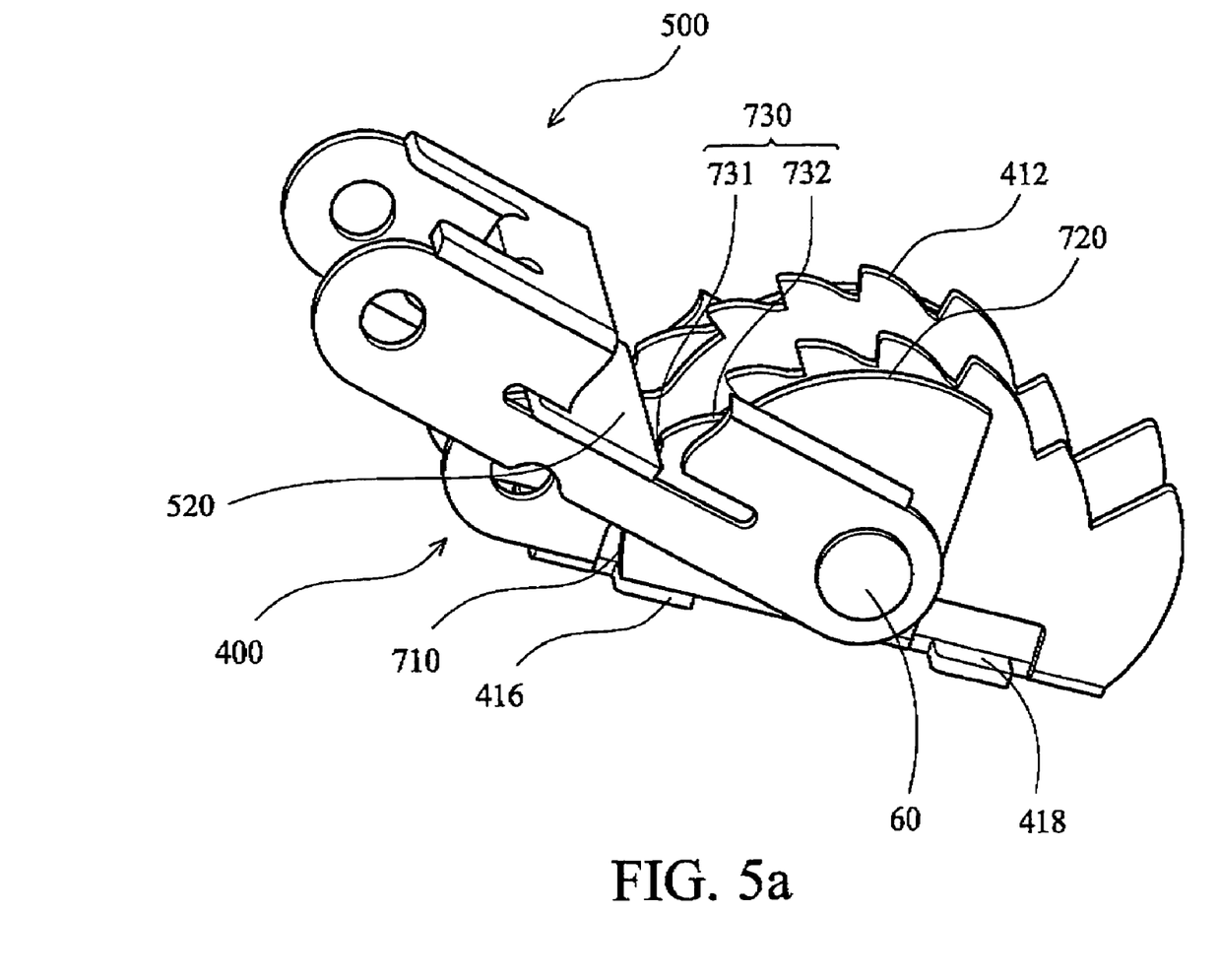
FIG. 5a is a schematic view showing the first and second links of the invention when the bracket is in the first position.
Figure 5B:
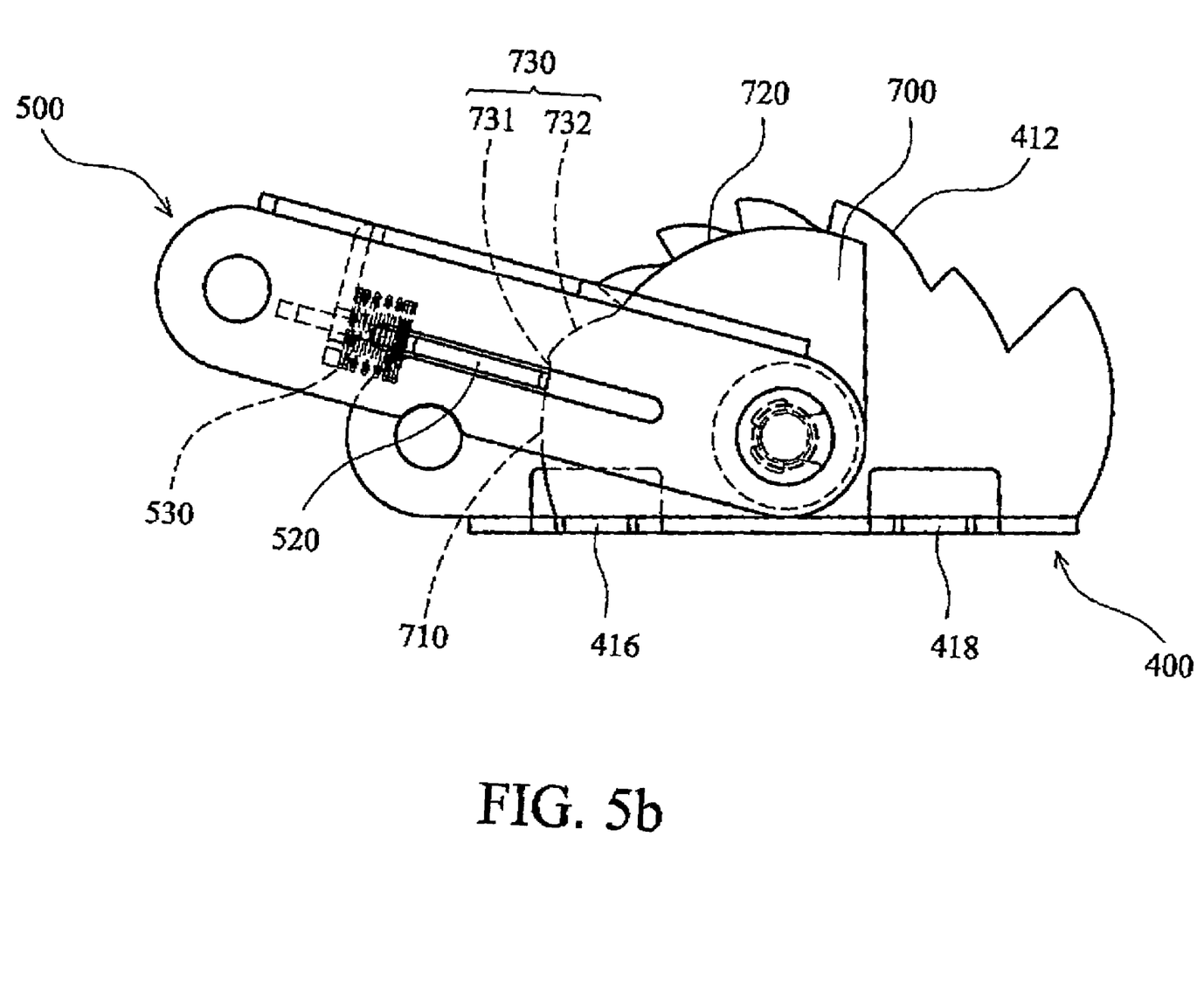
Figure 6A:
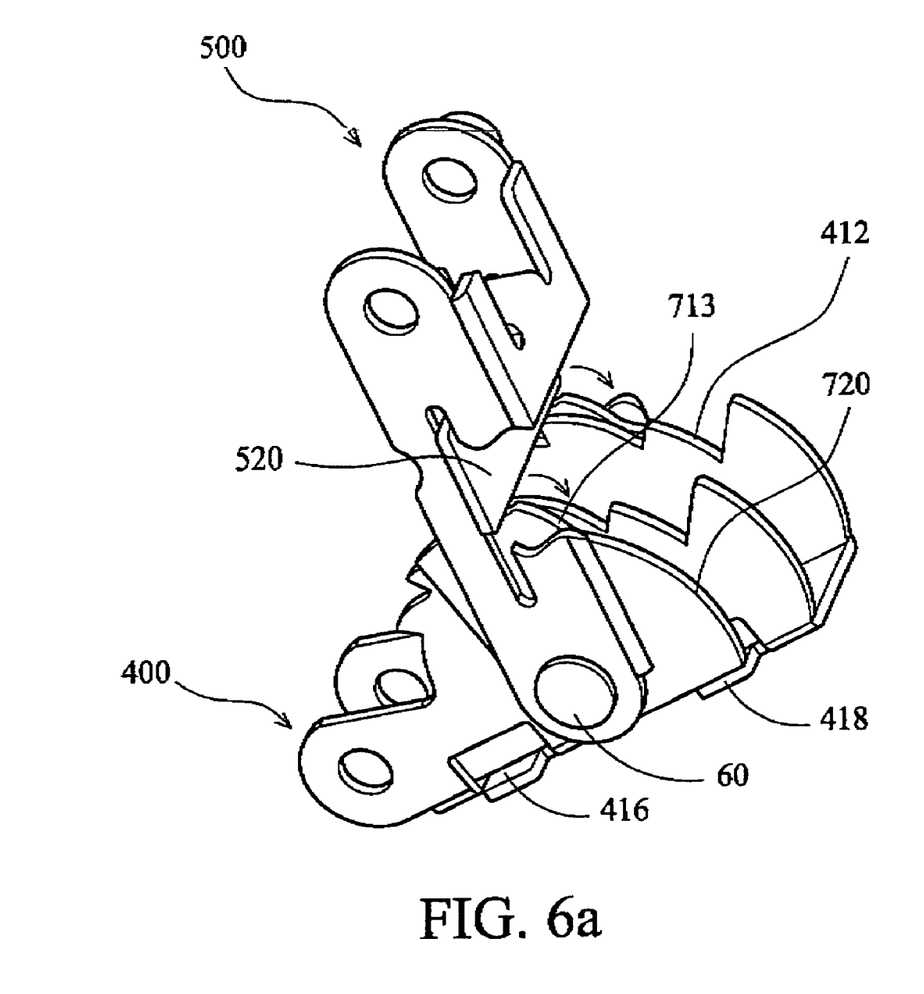
FIG. 6a is a schematic view showing the first and second links of the invention as the bracket approaches the second position.
Figure 6B:
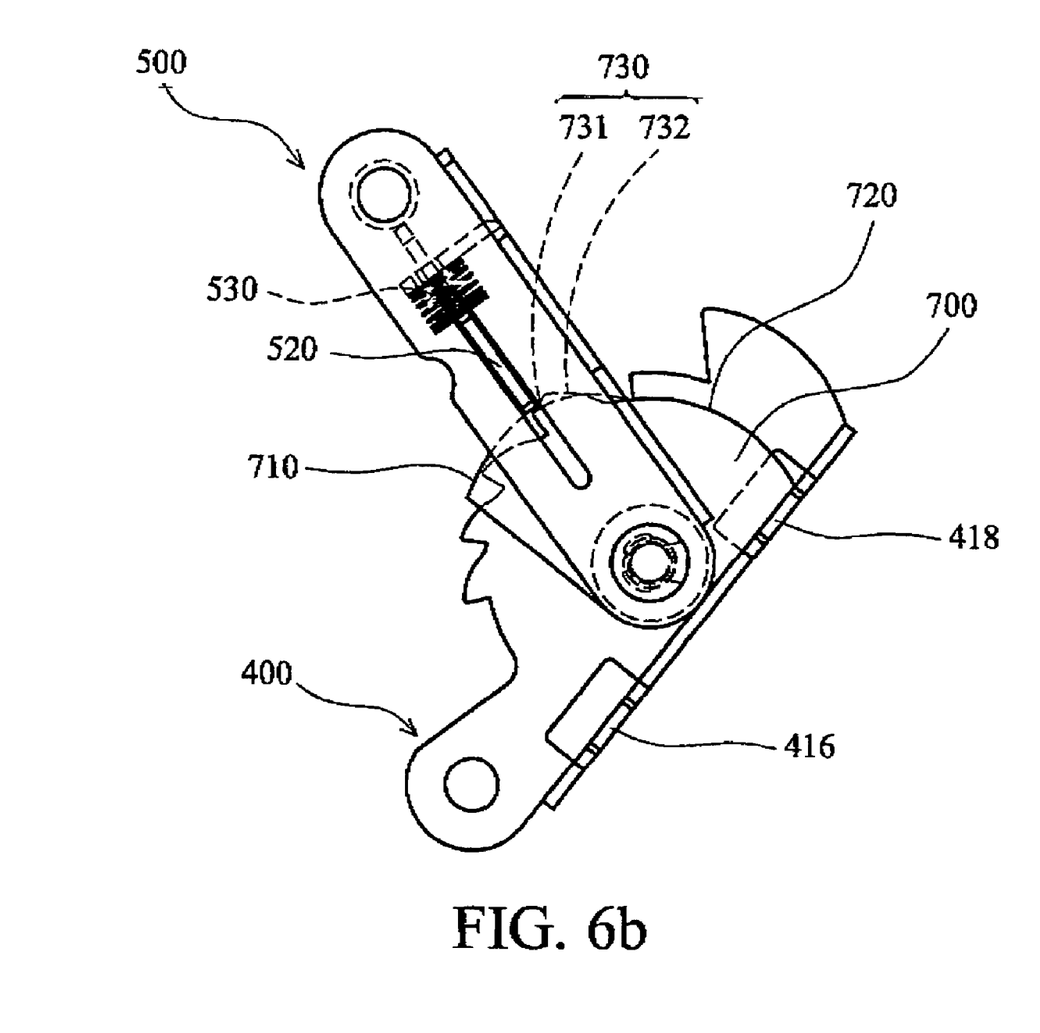

Referring to FIG. 2 again, when the bracket 300 rotates from the second position to the first position, the stopper 520 abuts the second side 732 of the reset plate 700 and abuts the second portion 720, whereby the reset plate 700 rotates along with the second link 500. As the second portion 720 is lower than the teeth 412, engagement of the stopper 520 and teeth 412 is not obstructed by the reset plate 700. As shown in FIGS. 5a and 5b, when the bracket 300 approaches the first position, the edge of the reset plate 700 abuts the first tab 416. At this time, as the second link 500 continues rotating, the stopper 520 moves from the second side 732 to the first side 731 and abuts the first side 731, thereby joining the first portion 710. As the first portion 710 is higher than the teeth 412, the reset plate 700 lifts the stopper 520, thereby releasing engagement of the stopper 520 and the teeth 412. The second link 500 can rotate clockwise to move the bracket 300 from the first position to the second position. Referring to FIGS. 6a and 6b, when the bracket 300 approaches the second position, the edge of the reset plate 700 abuts the second tab 418. At this time, as the second link 500 continues rotating, the stopper 520 moves from the first side 731 to the second side 732 and joins the second portion 720. As the second portion 720 is lower than the teeth 412, the stopper 520 re-engages the teeth 412.

Figure 7A:
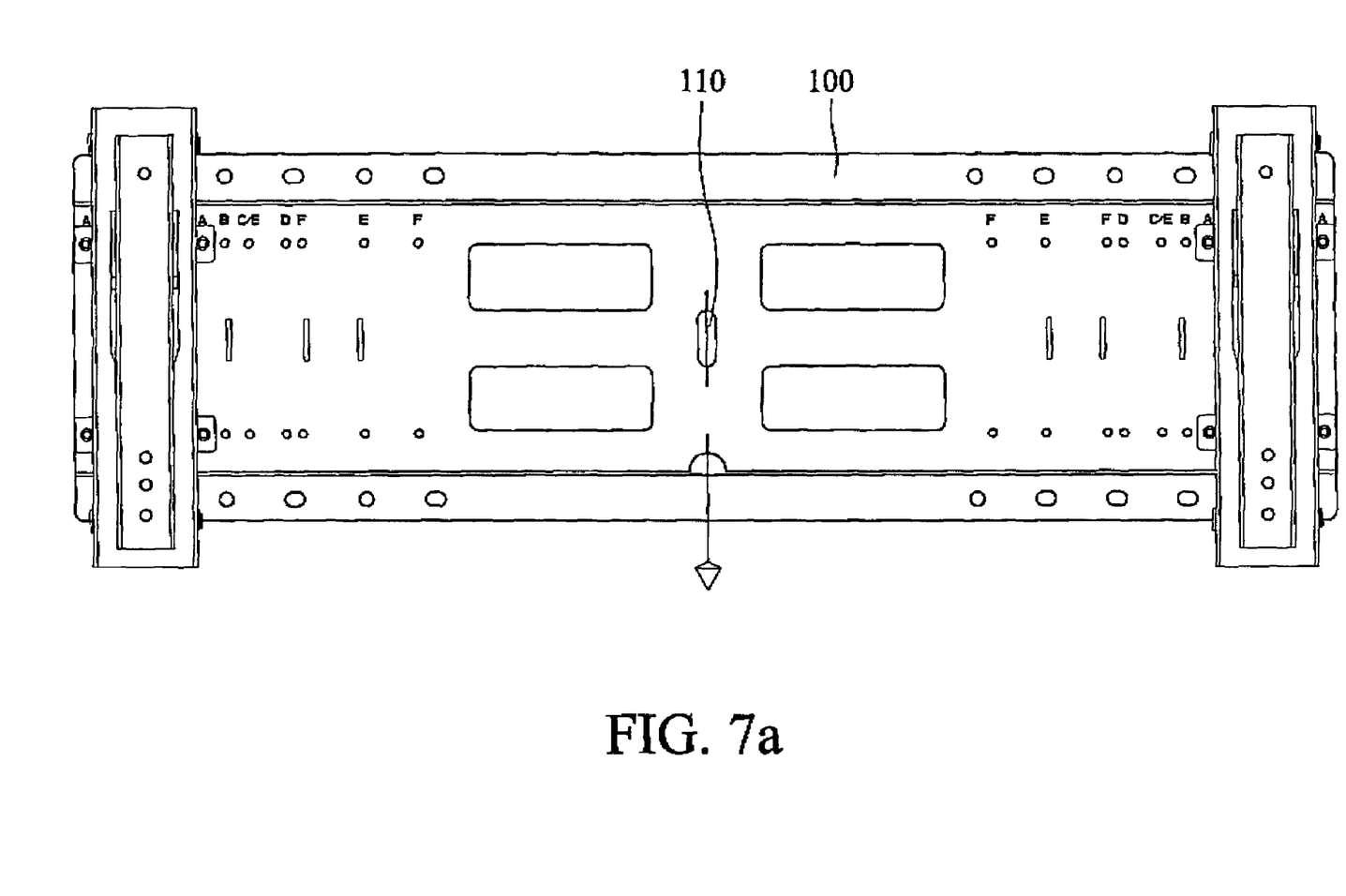
FIG. 7a is a schematic view of an embodiment of a panel according to the invention.
Figure 7B:
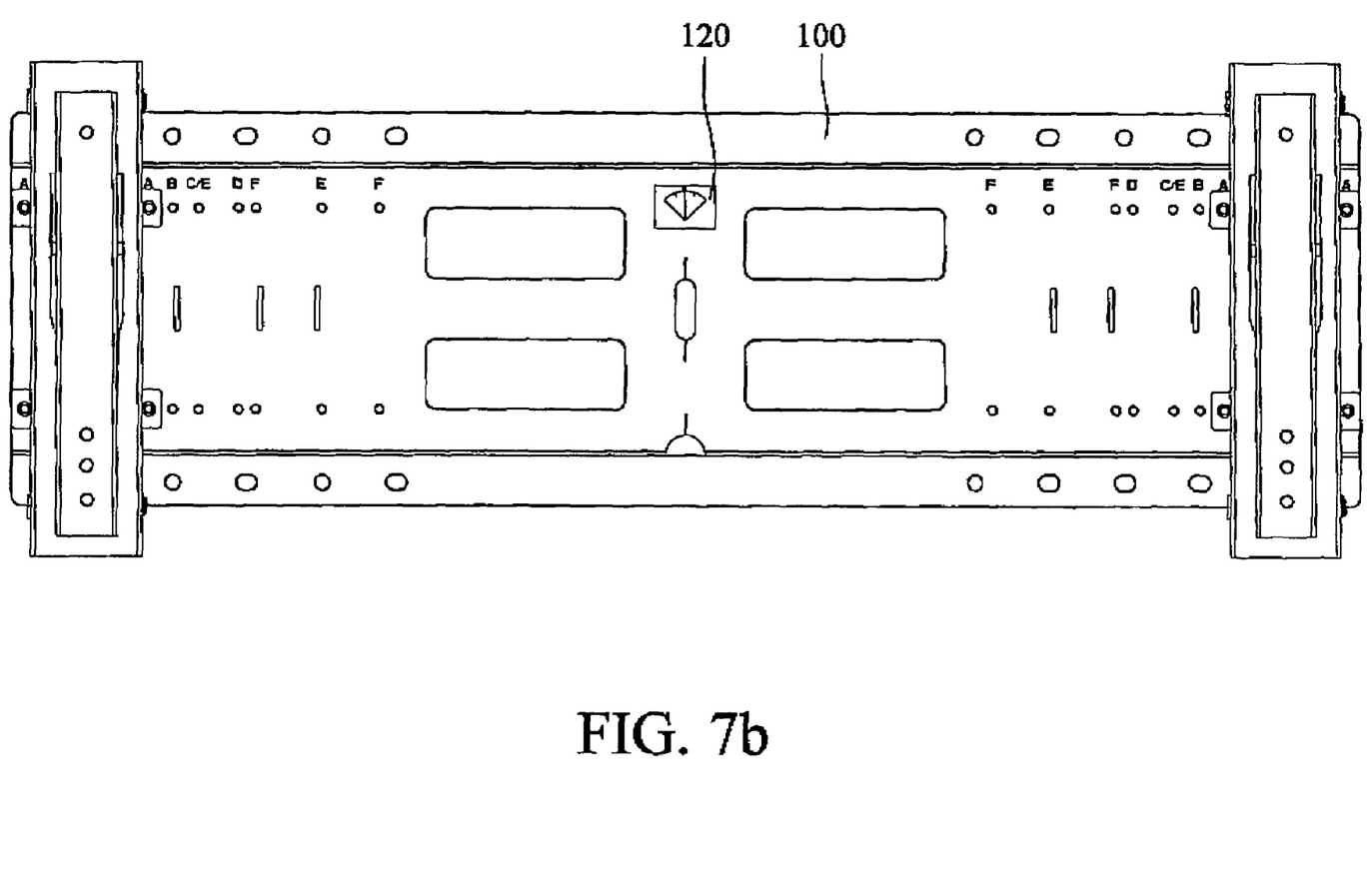
FIG. 7b is a schematic view of another embodiment of a panel according to the invention.
Figure 7C:
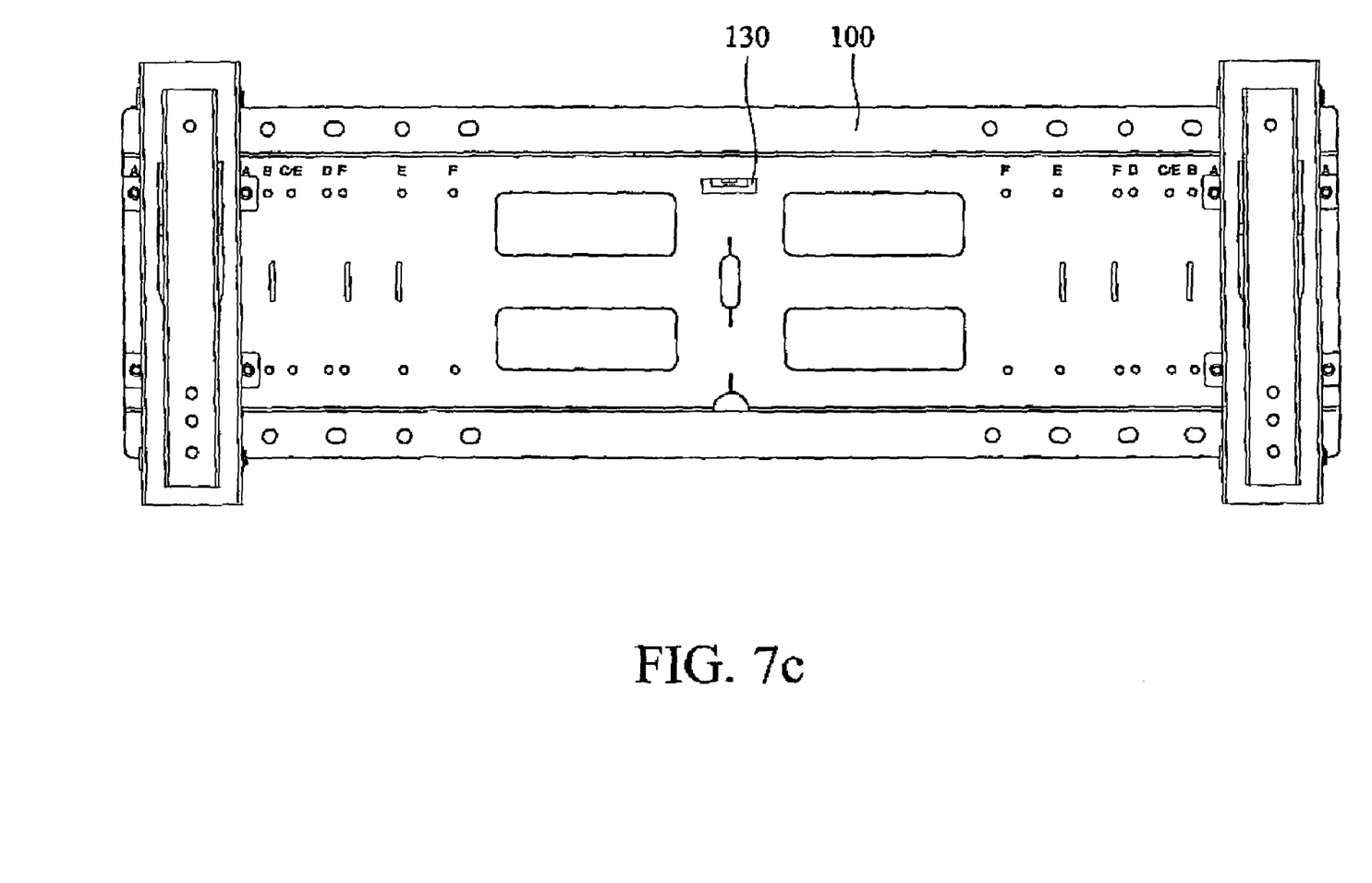
FIG. 7c is a schematic view of another embodiment of a panel according to the invention.

A level can be disposed on the panel 100 to adjust the horizontality of the panel 100. FIGS. 7a to 7c depict various levels disposed on the panel 100. FIG. 7a shows a gravity-type level 110, FIG. 7b a pointer-type level 120 and FIG. 7c a bubble-type level 13.

Although two hangers are secured to the panel 100 in this embodiment, the disclosure is not limited thereto. One or multiple hangers are also applicable.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hanger for an electronic apparatus, comprising:
a base mounted on a wall;
a bracket pivoting on the base;
a first link pivoting on the base and having a ratchet with a plurality of teeth; and
a second link rotatably connecting the first link and the bracket and having a stopper,
wherein the bracket rotates between a first position and a second position, the angle between the bracket and the base is varied by the stopper engaging each tooth of the ratchet, and the teeth are inclined toward the base, whereby the angle between the bracket and the base is adjustable when the bracket rotates from the first position to the second position and is not adjustable when the bracket rotates from the second position to the first position further comprising a reset plate pivoting on the first link and rotating along with the second link, wherein the reset plate releases the engagement of the stopper and the teeth when the bracket is in the first position, and the stopper engages the teeth again when the bracket is in the second position.

2. The hanger as claimed in claim 1, wherein, when in the first position, the bracket overlaps the base, and when in the second position, an angle between the bracket and the base is maximized.

3. The hanger as claimed in claim 1, wherein the reset plate has a first portion higher than the teeth and a second portion lower than the teeth, and when the bracket is in the first position, the stopper abuts the first portion of the reset plate, thereby releasing the engagement of the stopper and the teeth, and when the bracket is in the second position, the stopper abuts the second portion, thereby the stopper engaging the teeth again.

4. The hanger as claimed in claim 3, wherein the reset plate has a protrusion between the first and second portions, and the protrusion has a first side adjacent to the first portion and a second side adjacent to the second portion; whereby, when the bracket is in the first position, the stopper abuts the first side and thereby abuts the first portion, and, when the bracket is in the second position, the stopper abuts the second side and thereby abuts the second portion.

5. The hanger as claimed in claim 4, wherein the first link has a first tab and a second tab, and, when the bracket is in the first position, the reset plate abuts the first tab, whereby the stopper abuts the first portion, and, when the bracket is in the second position, the reset plate abuts the second tab, whereby the stopper abuts the second portion.

6. The hanger as claimed in claim 1, wherein the second link has a bias element biasing the stopper to maintain the engagement of the stopper and the teeth.

7. The hanger as claimed in claim 6, wherein the bias element is a compression spring.

8. The hanger as claimed in claim 1, further comprising a joint element which joins the bracket and the electronic apparatus.

9. The hanger as claimed in claim 1, further comprising a panel mounted on the wall, the base being secured to the panel.

10. The hanger as claimed in claim 9, wherein the panel has a level adjusting the horizontal state of the panel.

* * * * *